(12) United States Patent
Wu et al.

(10) Patent No.: US 6,715,593 B1
(45) Date of Patent: Apr. 6, 2004

(54) CRUSH TUBE ASSEMBLY

(75) Inventors: Chi-Chin Wu, West Bloomfield, MI (US); Joseph Daniel Sellepack, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,243

(22) Filed: Sep. 27, 2002

(51) Int. Cl.[7] .................................................. F16F 7/12
(52) U.S. Cl. ....................................................... 188/377
(58) Field of Search ................................ 188/371, 377; 267/139; 74/492; 293/132

(56) References Cited

U.S. PATENT DOCUMENTS

| | | | |
|---|---|---|---|
| 3,508,633 A | * | 4/1970 | Nishimura et al. ......... 188/377 |
| 3,831,997 A | | 8/1974 | Myers |
| 5,033,593 A | | 7/1991 | Kazuhito |
| 5,403,049 A | | 4/1995 | Ebbinghaus |
| 5,914,163 A | | 6/1999 | Browne |
| 6,123,616 A | | 9/2000 | Otsuka |
| 6,308,809 B1 | | 10/2001 | Reid et al. |
| 6,312,038 B1 | | 11/2001 | Kawamura et al. |
| 6,460,667 B1 | * | 10/2002 | Bruck et al. ................ 188/371 |

* cited by examiner

Primary Examiner—Jack Lavinder
Assistant Examiner—Xuan Lan Nguyen
(74) Attorney, Agent, or Firm—Gigette Rejin

(57) ABSTRACT

A crush tube assembly for absorbing impact energy is provided. A first tube substantially free from convolutions is disposed about a second tube substantially free from convolutions. A third tube having convolutions is also disposed within the first tube, and may be interposed between the first and second tubes. The convolutions support the axial integrity, and minimize lateral bucking of the first and second tubes during the absorption of impact energy. Additional alternating layers of smooth and convoluted tubes may be alternatively disposed within the assembly to provide further strength and control for absorbing energy. A method for absorbing impact energy is also provided. The method includes the steps of providing a first tube substantially free from convolutions, disposing within said first tube a second tube substantially free from convolutions, interposing between said first and second tubes a third tube having convolutions; and impacting said first, second, and third tubes.

20 Claims, 6 Drawing Sheets

CRUSH TUBE ASSEMBLY

BACKGROUND OF THE INVENTION

1. Field of the Invention

This invention relates to an impact energy absorption system, and in particular to a crushable tubular assembly for efficient and controllable energy absorption.

2. Background of the Invention

In current vehicle structures, and particularly in front-end structures, it has become increasingly difficult to obtain package space for components that absorb impact energy created during a vehicle crash. Conventional designs for absorbing high-energy impacts, such as that described in U.S. Pat. No. 3,831,997 to Myers, typically include tubular structures that are made from high strength materials like various high strength steels. These tubular structures may be designed as vehicle rails, or may be separately positioned in a fore/aft direction of the vehicle to absorb the energy of a fore/aft collision. However, such designs have a tendency to buckle laterally if the load is offset, that is, if the load is not concentric with the tube. Moreover, because of the limited package spaces available, with limited frame selection allowed, improving the axial strength of such structures tends to increase the degree of lateral instability of the tubes.

Other conventional designs include tubular assemblies that have structures for initiating deformations in the assembly, such as described in U.S. Pat. No. 5,914,163 to Browne. These features include slits or other structures to initiate longitudinal splitting, tearing, or peeling of the tubular assembly. While providing such structures may assist in controlling the energy absorbed in an impact, the overall axial strength of such tubular structures may be compromised.

Still other systems for absorbing frontal impact energy include entire redesigns of an automotive vehicle body structure, such as, for example, the vehicle body structure described in U.S. Pat. No. 6,312,038 to Kawamura, et al. Such designs may include extensions of the vehicle body/frame in the fore/aft direction in order to accommodate one or more energy absorbing members. Such redesigns, however, are expensive to develop and are not compatible with automobiles in present production. In particular, presently produced automobiles may not have the necessary package space available for housing an increased number of absorbing members, or tubes.

There is thus a need for an impact energy absorption system that will minimize or eliminate one or more of the above-mentioned deficiencies.

SUMMARY OF INVENTION

The present invention provides an improved impact energy absorption system, and a method for absorbing impact energy.

An impact energy absorption system in accordance with the present invention comprises an assembly of crush tubes. The crush tube assembly includes a first tube disposed about a second tube. A third tube having convolutions is also disposed within the first tube, and may be interposed between the first and second tubes. The third tube may alternatively be disposed within the second tube. The convolutions of the third tube support the axial integrity, and minimize lateral bucking of the first and second tubes during the absorption of impact energy. Additional alternating layers of smooth and convoluted tubes may be alternatively disposed within the assembly to provide further strength and control for absorbing energy.

A method for absorbing impact energy is also provided. The method includes the steps of providing a first tube substantially free from convolutions, disposing within said first tube a second tube substantially free from convolutions, interposing between said first and second tubes a third tube having convolutions; and impacting said first, second, and third tubes.

An impact energy absorption system in accordance with the present invention has several advantages as compared to conventional systems. The inventive device provides the axial strength of a conventional smooth, or unconvoluted tube and the energy absorption control of a convoluted tube. The inventive device, therefore, can absorb high-energy impacts that may be offset, while reducing the tendency to buckle laterally. Additionally, the inventive device maximizes the use of available package space by disposing each crush tube about one another. Accordingly, the present invention is able to absorb broad ranges of crush energy and maintain its lateral stability during a crash.

These and other features and objects of this invention will become apparent to one skilled in the art from the following detailed description and the accompanying drawings illustrating the features of this invention by way of example.

DETAILED DESCRIPTION

Figure 1:
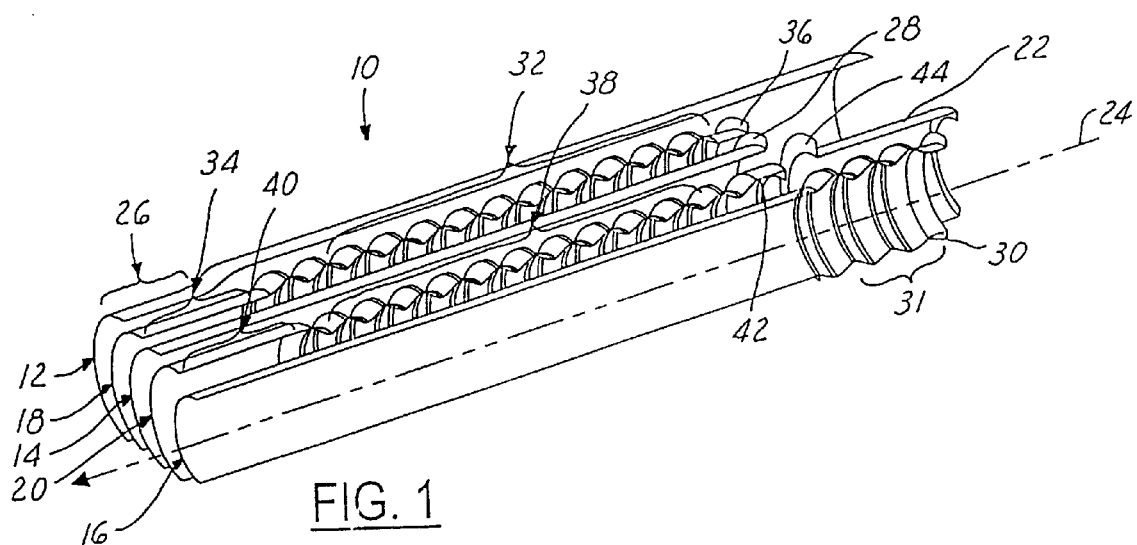
FIG. 1 is an exploded cross-sectional perspective view of a crush tube assembly in accordance with one embodiment of the present invention.
Figure 2:
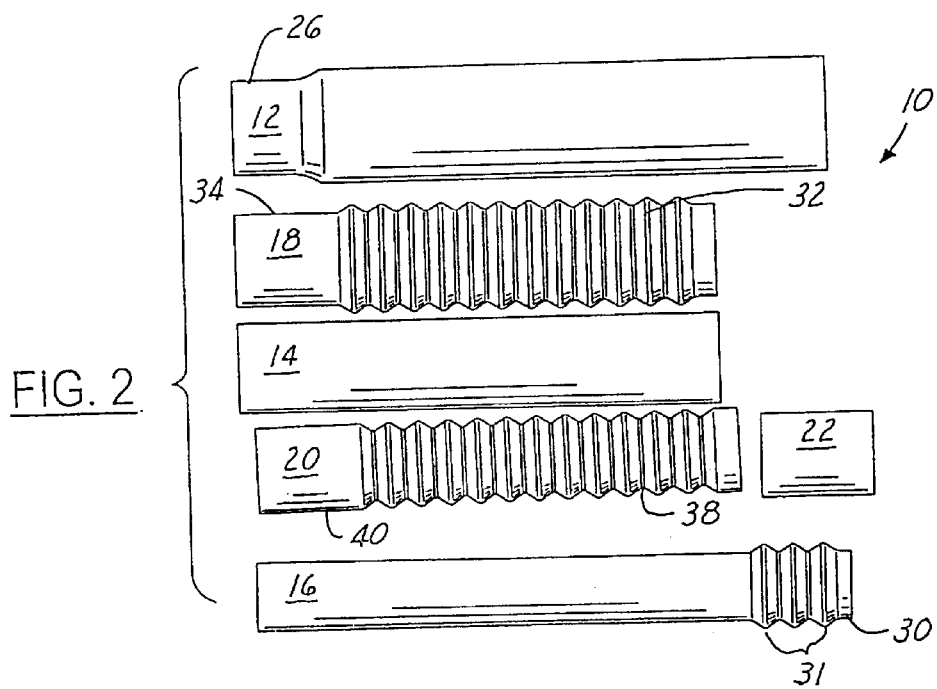
FIG. 2 is a side view of the components of the crush tube assembly of FIG. 1.
Figure 3:
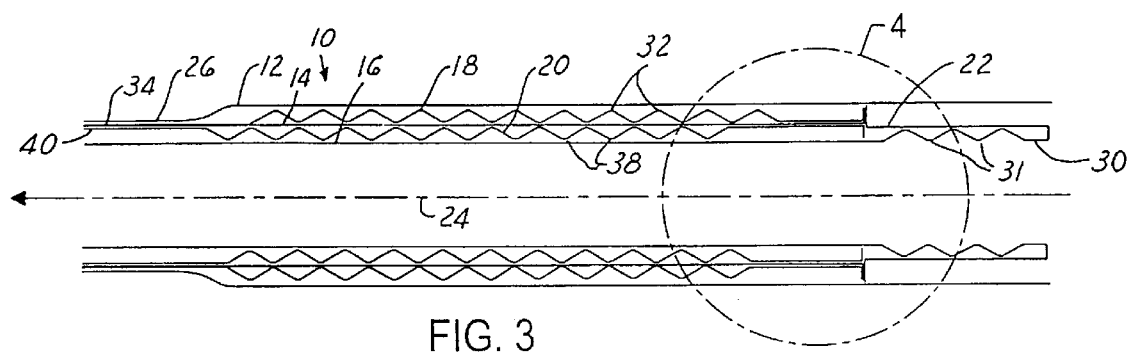
FIG. 3 is a cross-sectional view of the crush tube assembly of FIG. 1.

Referring now to the drawings wherein like reference numerals are used to identify identical components in the various views, FIGS. 1, 2, and 3 illustrate a crush tube assembly 10 in accordance with one embodiment of the present invention. Assembly 10 is provided to absorb impact energy sustained during an automobile collision. Assembly 10 is configured for use in a front-end structure of a vehicle, such as vehicle frame rails. It should be understood, however, that assembly 10 might find use in a variety of locations of and components for a vehicle structure. Assembly 10 includes a plurality of alternating smooth and convoluted crush tubes of a general cylindrical shape. It will be appreciated by those skilled in the art that other shapes may also be suitable. As discussed in greater detail below, assembly 10 may include an outer tube 12, an inner tube 14, a core tube 16, a first convoluted tube 18, a second convoluted tube 20, and a seal cap 22.

Tube 12 provides a rigid outer support structure for assembly 10. Tube 12 may be generally "flat" or "smooth," which, as used herein, means substantially free from convolutions. Tube 12 may be constructed from various grades of mild steel, high strength steel or ultrahigh strength steel, such as dual phases steels or TRIP steels. It may further be constructed from composite materials such as Sheet Molded Composites (SMC) or Glass Reinforced Polyester Composites. It should be understood, however, that material composition and method of manufacture of tube 12, as well as any other tube of this invention, might be varied without departing from the spirit of the present invention. Tube 12 may be disposed about a longitudinal axis 24. Tube 12 may further have a neck, or turtleneck, 26 at one end. Neck 26 may be provided to initially receive the impact energy from a force directed along, or substantially along, axis 24. Upon impact, neck 26 collapses, or otherwise axially directs the impact energy through assembly 10. The remaining portion of tube 12 provides axial strength to assembly 10 for absorbing impact energy and provides a structure in which other tubes may be disposed.

Figure 4:
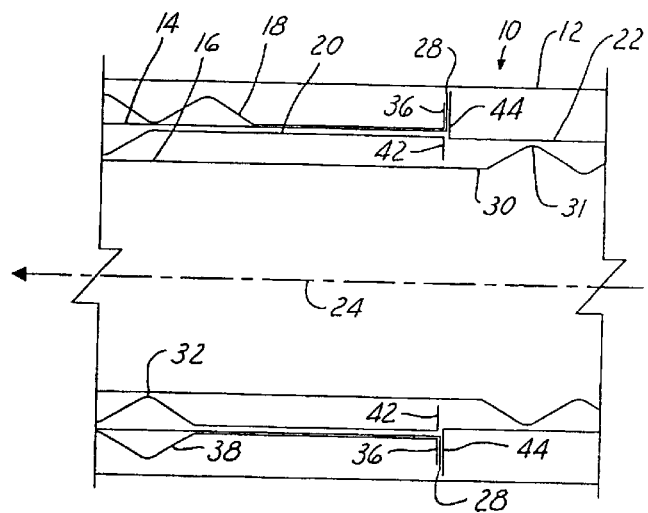
FIG. 4 is a magnified view of section 4 of the crush tube assembly of FIG. 3.

Tube 14 is disposed within tube 12. Tube 14 may be disposed about a longitudinal axis which is common to axis 24 of tube 12. In the embodiment shown in FIGS. 1, 2, and 3 tube 14 is concentrically disposed within tube 12. However, it will be recognized by those skilled in the art that the longitudinal axes of tube 12 and tube 14 need not be concentric. As shown, tube 14 is generally smooth. Tube 14 is provided to reinforce the axial strength of assembly 10 for absorbing impact energy. Tube 14 may be constructed from the same materials as tube 12. Tube 14 may be shorter than tube 12. As shown in FIG. 4, tube 14 may further have a collar 28 extending radially outward at one end. Collar 28 provided to abut seal cap 22 and transmit an axial load to seal cap 22.

Tube 16 is disposed within tube 14. Tube 16 may be disposed about a longitudinal axis which is common to axis 24 of tube 12. In the embodiment illustrated in FIGS. 1, 2, and 3 tube 16 is concentric with tube 12 and tube 14. Tube 16 may be constructed from the same materials as tube 12 and tube 14. Tube 16 may be approximately same length as tube 12. Tube 16 may have a generally smooth body. Tube 16 may further have an end segment 30 that has convolutions 31. End 30 may be the approximate difference between the lengths of tube 12 and tube 14, and extends axially distal from collar 28. The convolutions 31 of end 30 may project radially outward to the inner periphery of seal cap 22. Convolutions 31 may be formed similar to the convolutions of tube 18 and tube 20, discussed below. Convolutions 31 are provided to allow tube 16 to axially deform to reduce the tendency to buckle laterally.

Tube 18 is interposed between tube 12 and tube 14. Tube 18 may be constructed from the same materials as tube 12. Tube 18 may be disposed about a longitudinal axis. In the embodiment shown in FIGS. 1, 2, and 3, tube 18 is concentric with tubes 12, 14, and 16. Tube 18 may be shorter than tube 12, and substantially the same length as tube 14. Tube 18 may have convolutions 32, a smooth extended end 34, and a collar 36.

Convolutions 32 are substantially disposed about the periphery of tube 18. In the embodiment illustrated in FIGS. 1, 2, and 3, convolutions 32 are entirely disposed about the body of tube 18. As illustrated in FIGS. 1 and 2, convolutions 32 generally project radially outward from tube 18. However, it will be appreciated by those skilled in the art that convolutions 32 may also project radially inward, or project both radially outward and inward from tube 18. Convolutions 32 are provided to control the energy absorption from an impact to assembly 10. Upon impact to assembly 10, convolutions 32 compress axially and provide lateral stability to assembly 10 by minimizing, or preventing, buckling. Convolutions 32 may be shaped in sinusoidal waveform or gear tooth wave, however it will be appreciated by those skilled in the art that other shapes will be suitable. Convolutions 32 may be formed by molding, cutting, hydro-forming, or any other conventional industrial manufacturing method. As discussed in greater detail below and as specifically shown in FIGS. 8 and 9, convolutions 32 project outward to the inner periphery of tube 12. Inward convolutions would similarly project to the outer periphery of tube 14.

Smooth end 34 extends from the convoluted body of tube 18 and is disposed within neck 26 of tube 12. Smooth end 34 provide additional rigid support within neck 26. Collar 36 projects radially outward from the other end of tube 18. As shown in FIG. 4, Collar 36 abuts collar 28 for transmitting an axial load toward seal cap 22.

Tube 20 may be interposed between tube 14 and tube 16. Tube 20 may be constructed from the same materials as tube 12. Tube 20 may be disposed about a longitudinal axis. In the embodiment shown in FIGS. 1, 2, and 3, tube 20 is concentric with tubes 12, 14, 16, and 18. Tube 20 may be shorter than tube 12, and substantially the same length as tubes 14 and 16. Tube 20 may have convolutions 38, a smooth extended end 40, and a collar 42.

Convolutions 38 are substantially disposed about the periphery of tube 20. In the embodiment illustrated in FIGS. 1, 2, and 3, convolutions 38 are entirely disposed about the body of tube 20. As illustrated in FIG. 1 and 2, convolutions 38 generally project radially inward from tube 20. However, it will be appreciated by those skilled in the art that convolutions 38 may also project radially outward, or project both radially outward and inward from tube 20. Convolutions 38 are provided to control the energy absorption from an impact to assembly 10. Upon impact to assembly 10 convolutions 38 compress axially and provide lateral stability to assembly 10 by minimizing, or preventing, buckling. Convolutions 38 may be formed by the same methods as convolutions 32. As discussed in greater detail below and specifically shown in FIGS. 8 and 9, convolutions 38 project inward to the outer periphery of tube 16. Outward convolutions would similarly project to the inner periphery of tube 14.

Smooth end 40 extends from the convoluted body of tube 20 and is disposed within neck 26 of tube 12. Smooth end 40 provides additional rigid support within neck 26. Collar 42 projects radially inward from the other end of tube 20. As shown in FIG. 4, Collar 42 abuts for transmitting an axial load toward seal cap 22.

Seal cap 22 is provided for additional axial support of tubes 14, 16, 18, and 20. Seal cap 22 is disposed within tube 12 and about convoluted end 30 of tube 16. Seal cap 22 may have a collar 44 projecting radially outward. As shown in FIG. 4, collar 44 is axially adjacent to and supports axial loads transmitted from collars 28, 36, and 42. Seal cap 22 may be made out of the same material as tube 12.

FIGS. 1 and 2 further illustrate the construction of crush tube assembly 10. Smooth tube 12 is provided. Smooth tube 14 is disposed within smooth tube 12, and smooth tube 16 is disposed within smooth tube 14. Convoluted tube 18 is interposed between tube 12 and tube 14. Convoluted tube 20 is interposed between tube 14 and tube 16. Upon the disposition of tubes within tube 12, seal cap 22 may be disposed within tube 12 and about end 30 of tube 16. The assembly 10 may then be sealed at the neck end 20 and at the seal cap 22 end.

While FIGS. 1, 2, and 3 depicts assembly 10 as including outer tube 12, inner tube 14, core tube 16, first convoluted tube 18, second convoluted tube 20, and seal cap 22, it will be appreciated by those skilled in the art that the inventive assembly may include greater or fewer convoluted tubes. For example, depending on the size of tube 12, additional alternating layers of smooth and convoluted crush tubes may be alternatively disposed within assembly 10 to provide further strength and control for absorbing impact energy. Similarly, assembly 10 may include fewer tubes than depicted. For example, assembly 10 may include outer tube 12, inner tube 14 disposed within tube 12, and core tube 16, disposed within tube 14, having convolutions 31 at end 30. Alternatively, assembly 10 may include outer tube 12, tube 14 disposed within tube 12, and convoluted tube 18 interposed between tube 12 and tube 14.

Figure 5:
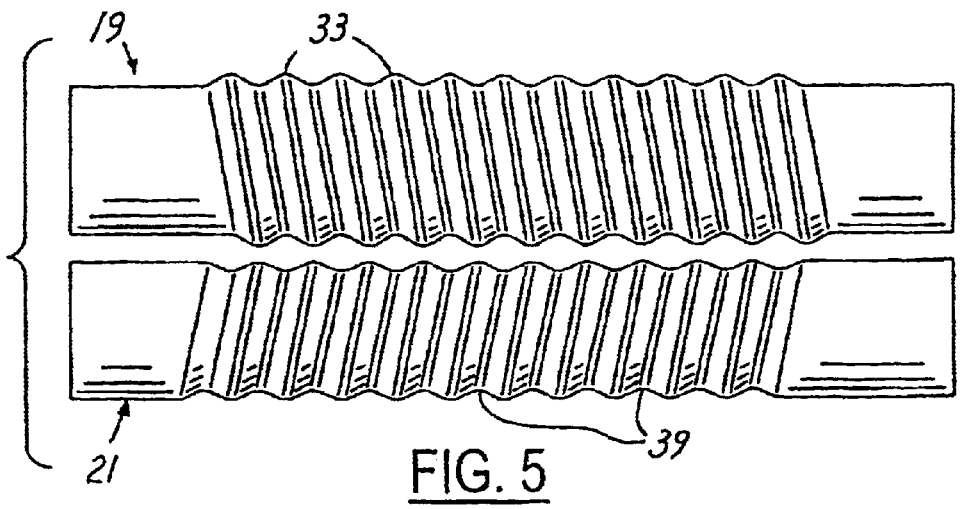
FIG. 5 is a side view of alternative convoluted tubes for the crush tube assembly of FIG. 1.

FIG. 5 depicts alternative convoluted crush tubes 19, 21, which can replace convoluted tubes 18, 20, respectively, in assembly 10. Convoluted crush tubes 19, 21 are substantially the same as convoluted tubes 18, 20, respectively, except that the form of convolutions 32, 38 are replaced with screw formed convolutions 33, 39, respectively. Convolutions 33 may be in clockwise screw form, while convolutions 39 may be in counter-clockwise screw form. It will be appreciated by those skilled in the art that the directions of such convolutions may be reversed. The interlacing screw form of convolutions 33 and convolutions 39 provides a strong support to each other and complement the torsional deformation in tube 19 and tube 21, which in turn provides a substantial stability for the entire assembly 10. Additionally, screw form convolutions 33, 39 may be more economic to manufacture than other shapes.

Figure 6:
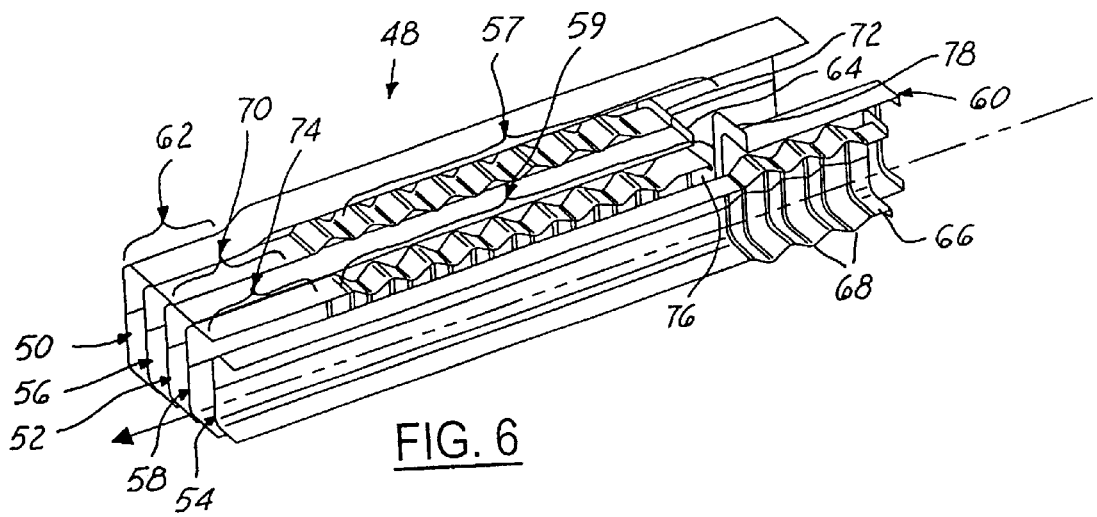
FIG. 6 is an exploded cross-sectional perspective view of a crush tube assembly in accordance with another embodiment of the present invention.
Figure 7:
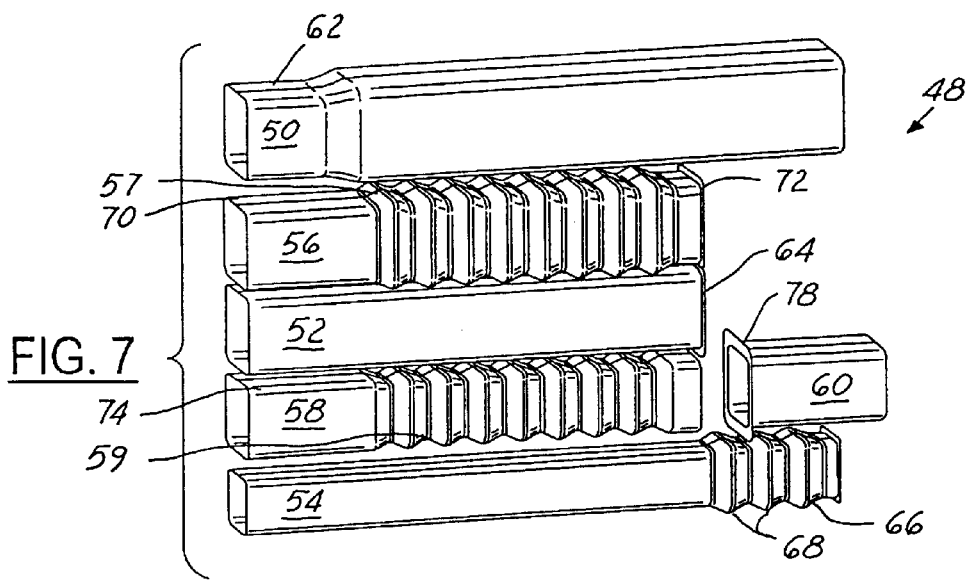
FIG. 7 is a perspective view of the components of the crush tube assembly of FIG. 6.

FIGS. 6 and 7 illustrate an alternative crush tube assembly 48 according to the present invention. Crush tube assembly 48 is similar to assembly 10, but is generally rectangular in cross-sectional shape. Assembly 48 includes a plurality of alternating smooth and convoluted crush tubes. Assembly 48 may include an outer tube 50, an inner tube 52, a core tube 54, a first convoluted tube 56, a second tube convoluted tube 58, and a seal cap 60. Tube 50 and tube 52 may be similar to tube 12 and tube 14, respectively, as tube 50 and tube 52 may generally be smooth. Further, like tube 12, tube 50 includes neck 62 at one of its ends. Tube 52 may have a collar 64 projecting outward from the end distal to neck 62. Tube 54 may be similar to tube 16 as it may have an end 66 with convolutions 68. Convoluted tube 56 may be interposed between tube 50 and tube 52, and convoluted tube 58 may be interposed between tube 52 and tube 54. Like tube 18, tube 56 may have outward projecting convolutions 57, and like tube 20, tube 58 may have inward projecting convolutions 59. Those skilled in the art, however, will similarly recognize that convolutions 57 and convolutions 59 may be outwardly projecting, inwardly projecting, or both outwardly and inwardly projecting from their respective tubes. Tube 56 may have a smooth extended end 70 disposed within neck 62 and an outwardly projecting collar 72 disposed about its other end. Similarly, tube 58 may have a smooth extended end 74 disposed within neck 62 and an inwardly projecting collar 76 disposed about its other end. The smooth ends 70, 74 and collars 72, 76 serve similar functions as smooth ends 34, 40 and collars 36, 42, respectively. Depending on the size of tube 50, additional layers of alternating smooth and convoluted crush tubes may be alternatively disposed within assembly 48 to provide further strength and control for absorbing impact energy. Seal cap 60 is similar to seal cap 22 and has a collar 78 projecting from its end proximate to collars 64, 72, and 76. Seal cap 60 axially supports loads transmitted from tube 52, tube 54, tube 56, and tube 58.

Figure 8:
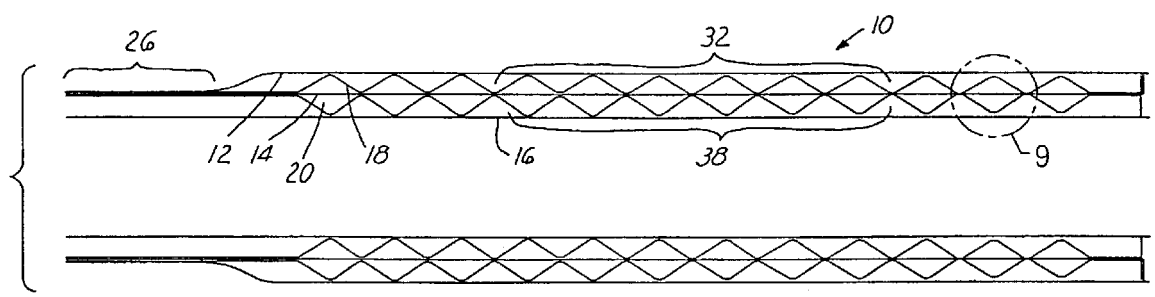
FIG. 8 is a partial cross-sectional side view of the crush tube assembly shown in FIG. 1.
Figure 9:
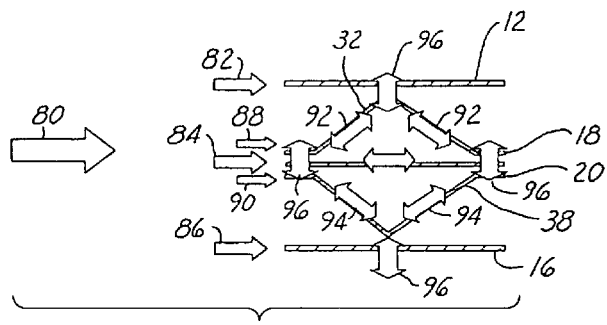
FIG. 9 is a magnified view of section 9 of the crush tube assembly shown in FIG. 8.

FIG. 8 illustrates a partial side sectional view of assembly 10 and depicts, from outer most to inner most, outer smooth tube 12, convoluted tube 18, smooth tube 14, convoluted tube 20, and smooth tube 16. FIG. 9 depicts a magnified view of portion 9 in FIG. 8. FIG. 9 further shows the development of membrane forces during axial loading. During an impact, axial force 80 is loaded on assembly 10. Axial force 80 causes a variety of compressive forces throughout assembly 10. In particular, axial force 80 results in longitudinal compressive forces 82, 84, and 86 on smooth tubes 12, 14, and 16, respectively and compressive forces 88 and 90 on convolutions 32, 38 respectively. Compression force 88 transfers to convolutions 32 of tube 18, and results in compressive forces 92 along convolutions 32 and normal contact forces 96 on the smooth tubes 12 and 14. Similarly, compression force 90 transfers to convolutions 38 of tube 20, and results in compressive forces 94 along convolutions 38 and normal contact forces 96 on the smooth tubes 14 and 16. Compressive forces 92 and 94 act to compress, or collapse, the convolutions of tubes 18 and 20, respectively. As convolutions 32 and 38 are being compressed, the convolutions provide lateral forces 96 to support the smooth tubes of assembly 10. For example, convolutions 32 support the inner periphery of tube 12 and the outer periphery of tube 14, and convolutions 38 support the inner periphery of tube 14 and the outer periphery of tube 16. Lateral forces 96 stabilize and reduce the buckling tendency of smooth tubes 12, 14, and 16 during axial loading. Such stabilization improves the ability of assembly 10 to absorb axial loaded impact energy. The angle of convolutions 32 and convolutions 38 may be adjusted to vary the energy absorption and stabilization capacity of tubes 12, 14, and 16. The energy absorption and stabilization capacity are inversely related to each other. For example, as the angle of convolution is increased, that is, as the convoluted tube approaches a smooth tube, the energy absorbing capacity of the convoluted tube increases, but the amount of lateral forces 96 the convolution provides decreases. Those skilled in the art will recognize that the angle of convolution may be optimized based on the application of the invention.

Figure 10:
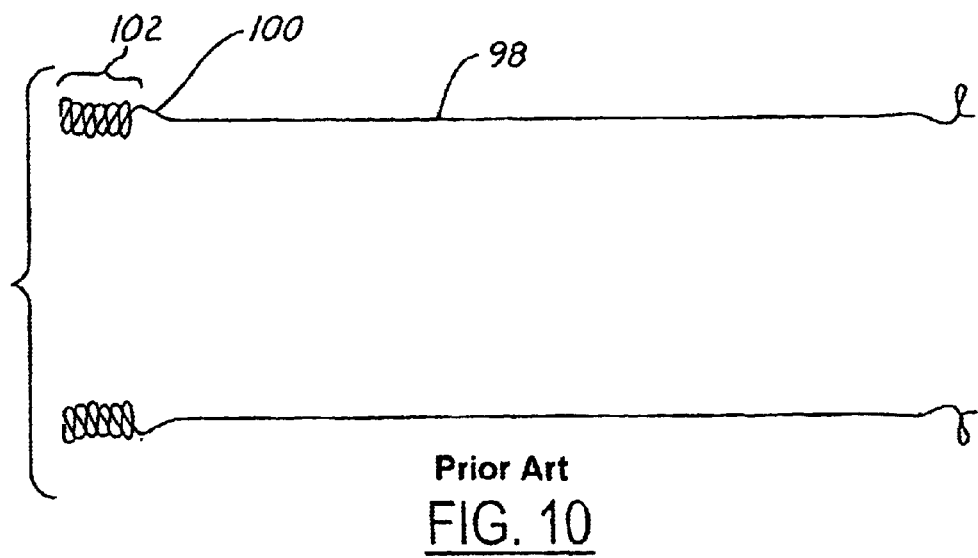
FIG. 10 is a deformation profile of a conventional smooth crush tube.
Figure 11:
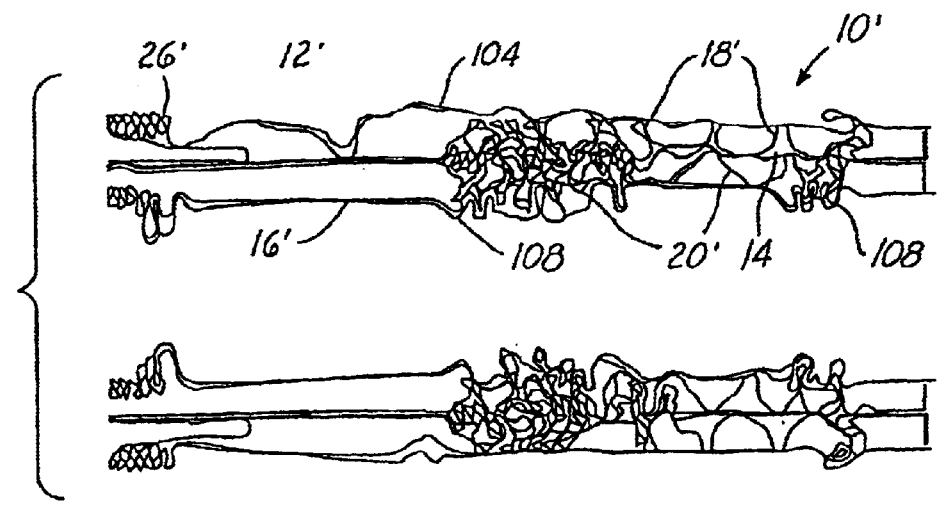
FIG. 11 is a deformation profile of a crush tube assembly in accordance with one embodiment of the present invention.

Computer simulated deformation profiles for a single smooth crush tube 98 and crush tube assembly 10" are shown in FIGS. 10 and 11, respectively. FIG. 10 illustrates a section view of a conventional smooth tube 98 after a simulated axially loading of a high-speed impact at end 100. After a high-speed impact at end 100, energy is only absorbed by the relatively small area of deformation 102. If the same space, material and weight of material are available, smooth tube 98 will result in less dissipated energy because, after impact, less material resulted in plastic (non-linear) deformation state as compared with the inventive assembly 10". The structure of tube 98 may produce higher impact force and intrusion to the backup structure where occupants of the vehicle may be seated. Conversely, a reduction of the gauge of smooth tube 98, so as to reduce the impact and intrusion to the backup structure, results in an increased tendency for tube 98 to buckle laterally.

In contrast, FIG. 11 depicts crush tube assembly 10" following a similar impact to crush tube assembly 10. Assembly 10" includes the same structure of assembly 10 and its features are identified by the same reference number with a prime """ to indicate that such features have sustained an impact. Neck area 26" receives the axial load. The convolutions of tubes 18" and 20" compress and provide lateral support to the peripheries of smooth tubes 12", 14" and 16". Accordingly, smooth tubes 12", 14", and 16" did not buckle and instead absorbed the axial impact energy while supported laterally by the convolutions so as to minimize the tendency to buckle.

Figure 12:
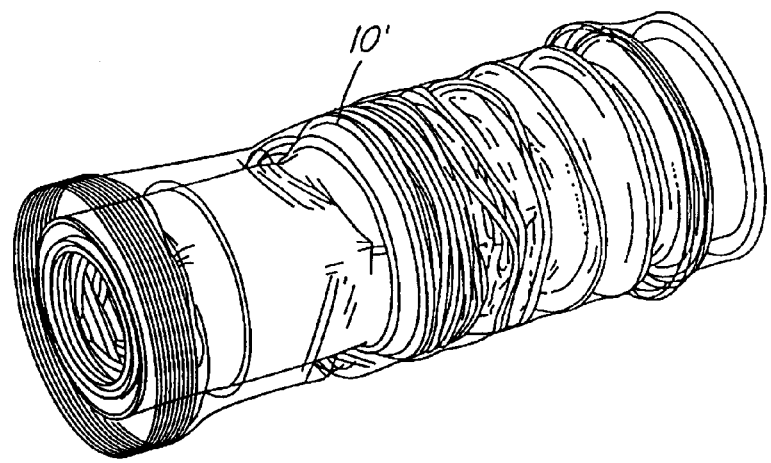
FIG. 12 is a partial cross-sectional perspective view of a deformed crush tube assembly in accordance with the embodiment of the present invention shown in FIG. 1.
Figure 13:
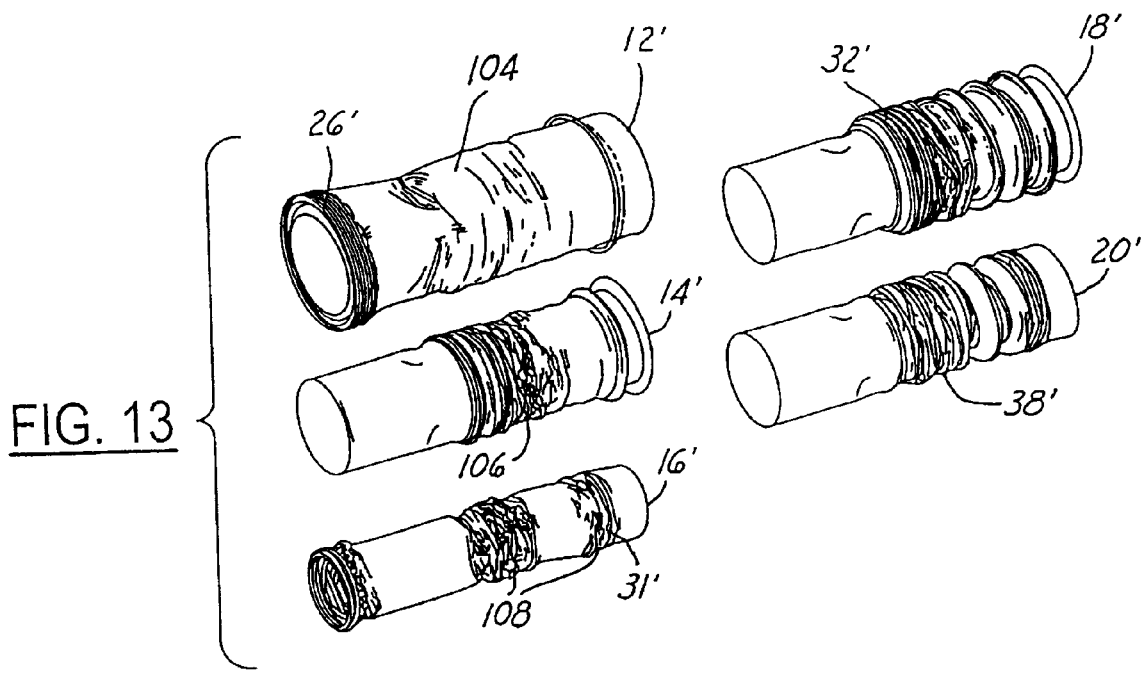
FIG. 13 is a perspective view of each tube, contained within the deformed crush tube assembly shown in FIG. 12.

FIGS. 12 and 13 illustrate perspective views of assembly 10", and of each deformed tube. Neck area 26" has absorbed significant impact energy, as it is shown to be significantly deformed in the axial direction. That is, neck area 26" axially collapses, or telescopes, toward the seal cap end of assembly 10". Convolutions of tubes 18" and 20" have compressed in the axial direction and provide lateral support to tubes 12", 14", and 16". Additionally, convolutions 31" of end 30 of tube 16" have also compressed axially to further prevent tube 16 from buckling. Smooth tubes 12", 14", and 16" did not buckle and instead absorbed the axial load as indicated by deformation areas 104, 106, and 108, respectively.

FIGS. 1, 11, 12, and 13 further depict a method of absorbing crash energy. Smooth tube 12 is provided. Smooth tube 14 is disposed within tube 12. Smooth tube 16 is disposed within tube 14, and may include an end 30 with convolutions 31. Convoluted tube 18 is interposed between tube 12 and tube 14, and convoluted tube 20 is interposed between tube 14 and tube 16. The assembly of tubes is then axially impacted. During impact, the convolutions of tube 18 and tube 20 laterally support smooth tubes 12, 14 and 16.

Through various combinations of smooth and convoluted tubes, and through various arrangements of convolutions, the present invention accommodates broad ranges of crush energy absorption. The present invention further maintains lateral stability and constant axial compression force during upon impact. Additionally, the invention efficiently employs package space through the use of nested, or telescoping tubes. While the invention has been particularly shown and described with reference to the preferred embodiments thereof, it will be appreciated by those skilled in the art that various changes and modifications can be made in the invention without departing from the spirit and scope of the invention.

What is claimed is:

1. A crush tube assembly comprising:
   a plurality of tubes each disposed about a longitudinal axis, said plurality of tubes comprising:
   a first tube substantially free from convolutions;
   a second tube substantially free from convolutions and disposed within said first tube;
   a third tube disposed within said second tube, said third tube having a body and an end segment, said body substantially free from convolutions and said end segment having convolutions;
   a fourth tube interposed between said first tube and said second tube, said fourth tube having convolutions, and
   a fifth tube interposed between said second tube and said third tube, said fifth tube having convolutions.

2. The crush tube assembly of claim 1, wherein said convolutions of said fourth tube and of said fifth tube are screw shaped.

3. The crush tube assembly of claim 1, wherein said convolutions of said fourth tube support the inner periphery of said first tube and the outer periphery of said second tube; and
   wherein said convolutions of said fifth tube support the inner periphery of said second tube and the outer periphery of said third tube.

4. The crush tube assembly of claim 1, wherein said convolutions of said fourth tube and said convolutions of said fifth tube are sinusoidal in shape.

5. The crush tube assembly of claim 1 wherein said convolutions of said fourth tube and said convolutions of said fifth tube are gear-tooth waved in shape.

6. The crush tube assembly of claim 1, wherein said plurality of tubes are substantially cylindrical.

7. The crush tube assembly of claim 1, wherein said plurality of tubes are substantially rectangular.

8. A crush tube assembly, comprising:
   a plurality of tubes each disposed about a longitudinal axis, said plurality of tubes comprising:
   a first tube substantially free from convolutions;
   a second tube having convolutions, said second tube further having a collar disposed about one end;
   a third tube disposed within said second tube, said third tube having a body and an end segment, said body substantially free from convolutions and said end segment having convolutions; and
   a tubular cap having a collar disposed about one end, said tubular cap disposed about said end segment of said third tube, wherein said collar of said tubular cap is axially adjacent said collar of said second tube.

9. The crush tube assembly of claim 8, further comprising:
   a fourth tube interposed between said first tube and said second tube, said fourth tube having convolutions, said fourth tube further having a collar disposed about one end; and
   a fifth tube interposed between said fourth tube and said second tube, said fifth tube being substantially free from convolutions, said fifth tube further having a collar disposed about one end;
   wherein said collar of said fourth tube and said collar of said fifth tube are axially adjacent said collar of said tubular cap.

10. The crush tube assembly of claim 9, wherein said collars of said tubular cap, said fourth tube, and said fifth tube extend radially outward.

11. The crush tube assembly of claim 9, wherein said convolutions of said second tube support the inner periphery of said fifth tube and the outer periphery of said third tube; and
   wherein said convolutions of said fourth tube support the inner periphery of said first tube and the outer periphery of said fifth tube.

12. The crush tube assembly of claim 9, wherein said convolutions of said second tube and said convolutions of said fourth tube are sinusoidal in shape.

13. The crush tube assembly of claim 9 wherein said convolutions of said second tube and said convolutions of said fourth tube convolutions are gear-tooth waved in shape.

14. The crush tube assembly of claim 9 wherein said convolutions of said second tube and said convolutions of said fourth tube are screw shaped.

15. The crush tube assembly of claim 9, wherein said plurality of tubes are substantially cylindrical.

16. The crush tube assembly of claim 9, wherein said plurality of tubes are substantially rectangular.

17. A method of absorbing crash energy, comprising:
providing a first tube substantially free from convolutions;
disposing within said first tube a second tube having convolutions;
disposing within said second tube a third tube having a body and an end segment, said body substantially free from convolutions and said end segment having convolutions;
interposing between said first tube and said second tube a fourth tube having convolutions;
interposing between said fourth tube and said second tube a fifth tube substantially free from convolutions; and
impacting said first, second, third, fourth, and fifth tubes.

18. The method of claim 17, wherein said step of disposing said second tube further comprises disposing within said first tube a second tube having convolutions and having a collar disposed about one end;
wherein said step of interposing said fourth tube further comprises interposing between said first tube and said second tube a fourth tube having convolutions and having a collar disposed about one end;
wherein said step of interposing said fifth tube further comprises interposing between said fourth tube and said second tube a fifth tube substantially free from convolutions and having a collar disposed about one end; and
further comprising the steps of disposing about said end segment of said third tube a tubular cap having a collar disposed about one end;
positioning said collar of said tubular cap axially adjacent said collars of said second, fourth, and fifth tubes; and
wherein said impacting step further comprises impacting said fourth tube, said fifth tube, and said tubular cap.

19. The method of claim 18, wherein the step of impacting further comprises impacting said first, second third, fourth, and fifth tubes substantially along a longitudinal axis of said first, second, third, fourth, and fifth tubes.

20. The method of claim 18, further comprising the step of laterally supporting said first tube, said body of said third tube, and said fifth tube with said convolutions of said fourth tube and said second tube.

\* \* \* \* \*